United States Patent
El-Boubbou

(10) Patent No.: US 10,629,339 B2
(45) Date of Patent: Apr. 21, 2020

(54) ACID-STABILIZED IRON-BASED METAL OXIDE COLLOIDAL NANOPARTICLES, AND METHODS THEREOF

(71) Applicants: National Guard Health Affairs, Riyadh (SA); King Saud bin Abdulaziz University for Health Sciences, Riyadh (SA); King Abdullah International Medical Research Center, Riyadh (SA)

(72) Inventor: Kheireddine El-Boubbou, Riyadh (SA)

(73) Assignees: National Guard Health Affairs, Riyadh (SA); King Saud bin Abdulaziz University for Health Sciences, Riyadh (SA); King Abdullah International Medical Research Center, Riyadh (SA)

( * ) Notice: Subject to any disclaimer, the term of this patent is extended or adjusted under 35 U.S.C. 154(b) by 670 days.

(21) Appl. No.: 14/886,734

(22) Filed: Oct. 19, 2015

(65) Prior Publication Data

US 2017/0110228 A1    Apr. 20, 2017

(51) Int. Cl.
   *H01F 1/44* (2006.01)
   *H01F 1/00* (2006.01)
   (Continued)

(52) U.S. Cl.
   CPC ............ *H01F 1/0054* (2013.01); *B82Y 30/00* (2013.01); *B82Y 40/00* (2013.01); *Y10S 977/773* (2013.01);
   (Continued)

(58) Field of Classification Search
   None
   See application file for complete search history.

(56) References Cited

U.S. PATENT DOCUMENTS 5,814,687 A * 9/1998 Kasai ................ C08K 3/22
523/122
6,638,494 B1 * 10/2003 Pilgrimm ............ A61K 9/5094
424/490

(Continued)

FOREIGN PATENT DOCUMENTS

CN       102815753 A      12/2012
JP       H08-325098 A  *  12/1996 ............ C01G 49/08

OTHER PUBLICATIONS

Machine Translation of JP H08-325098 (Year: 1996).*
(Continued)

*Primary Examiner* — Elizabeth A Robinson
*Assistant Examiner* — Thomas A Mangohig
(74) *Attorney, Agent, or Firm* — Oblon, McClelland, Maier & Neustadt, L.L.P.

(57) ABSTRACT

Size-controlled ultra-small iron-based metal oxide nanoparticles, nanocolloids comprising the nanoparticles, and methods of making the nanoparticles. The method for making the iron-based nanoparticles include sequential mixing of an iron(III) salt, a metal (II) salt, a carboxylic acid, an amine, and an inorganic base in water at temperatures ranging from 25-80° C. Nanoparticles in the size ranging from 2 nm to 10 nm with a narrow size distribution are obtained with the method. The nanoparticles have an iron-based core surrounded by molecules such as a panel of different carboxylates, polycarboxylates, and amines. Depending on the hydrophilicity of the carboxylates used, the functional nanoparticulate colloid can be dispersed in either organic or aqueous solvents. The nanocolloids comprise the nanoparticles in a concentration ranging from 1-10 mg/ml, and are stable for at least several months.

4 Claims, 22 Drawing Sheets

(51) Int. Cl.
 *B82Y 40/00* (2011.01)
 *B82Y 30/00* (2011.01)
(52) U.S. Cl.
 CPC ........ *Y10S 977/892* (2013.01); *Y10S 977/902* (2013.01)

(56) References Cited

U.S. PATENT DOCUMENTS

| | | | |
|---|---|---|---|
| 2004/0023030 A1* | 2/2004 | Bonitatebus, Jr. | B82Y 25/00 428/402.22 |
| 2007/0172426 A1* | 7/2007 | Lee | A61K 41/0028 424/9.32 |
| 2008/0089836 A1* | 4/2008 | Hainfeld | A61K 49/0428 424/1.11 |
| 2010/0330704 A1* | 12/2010 | Nakahama | B82Y 25/00 436/518 |
| 2015/0064103 A1 | 3/2015 | Guardia Giros et al. | |

OTHER PUBLICATIONS

Atta, A.M., et al., "Synthesis of Stabilized Myrrh-Capped Hydrocolloidal Magnetite Nanoparticles", Molecules, vol. 19, pp. 11263-11278, (Jul. 2014).
El-Boubbou, K., et al., "Ultra-Small Fatty Acid-Stabilized Magnetite Nanocolloids Synthesized by In Situ Hydrolytic Precipitation", Journal of Nanomaterials, vol. 2015, Total 12 Pages, (2015).

* cited by examiner

ACID-STABILIZED IRON-BASED METAL OXIDE COLLOIDAL NANOPARTICLES, AND METHODS THEREOF

BACKGROUND OF THE INVENTION

Technical Field

The present invention relates to preparation of size-controlled ultra-small surface-modified iron-based metal oxide nanoparticles, nanocolloids containing such nanoparticles, and methods of producing such nanoparticles for applications that require nanoparticles with advantageous magnetic properties.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metal oxide nanoparticles have been produced through various synthetic methods such as basic aqueous co-precipitation, sol-gel, microemulsion, sonochemical processes, thermal decomposition of organometallic precursors and reduction of metal ions at elevated temperatures [M. H. El-Dakdouki, K. El-Boubbou, J. Xia, H. Kavunja, X. Huang, Chemistry of Bioconjugates, 281-314, John Wiley & Sons, 2014; A.-H. Lu, E. L. Salabas, F. Schüth, Angewandte Chemie International Edition, 46, 8, 1222-1244, 2007; S. Sun, C. B. Murray, D. Weller, L. Folks, A. Moser, Science, 287, 5460, 1989-1992, 2000; N. Lee, T. Hyeon, Chemical Society Reviews, 41, 2575-2589, 2012; Jun, Y.-w.; Lee, J.-H.; Cheon, J., Angewandte Chemie International Edition, 47, 5122-5135, 2008; Wahajuddin, M.; Arora, S., International Journal of Nanomedicine, 7, 3445-3471, 2012—each incorporated herein by reference in its entirety]. Among these methods, thermal decomposition of organometallic compounds in high boiling point, nonpolar organic solvents has been the most attractive route to synthesize monodisperse nanocrystals and to afford control over the size of the nanocrystals [C. B. Murray, S. Sun, U.S. Pat. No. 6,262,129; S. Sun, C. B. Murray, D. Weller, L. Folks, A. Moser, Science, 287, 5460, 1989-1992, 2000; S. Sun, H. Zeng, Journal of the American Chemical Society, 124, 28, 8204-8205, 2002; S. Sun, H. Zeng, D. B. Robinson, S. Raoux, P. M. Rice, S. X. Wang, G. Li, Journal of the American Chemical Society, 126, 1, 273-279, 2004; J. Park, K. An, Y. Hwang, J.-G. Park, H.-J. Noh; J.-Y. Kim, J.-H. Park, N.-M. Hwang, T. Hyeon, Nature Materials, 3, 12, 891-895, 2004; N. R. Jana, Y. Chen, X. Peng, Chemistry of Materials, 16, 20, 3931-3935, 2004; Yu, W. W.; Falkner, J. C.; Yavuz, C. T.; Colvin, V. L., Chemical Communications, 2306-2307, 2004; K. Abdulwahab, M. A. Malik, P. O'Brien et al., Dalton Transactions, 42, 1, 196-206, 2013—each incorporated herein by reference in its entirety]. Another strategy is "hot-injection" by rapid introduction of reagents into the hot solution (≥300° C.) containing the surfactants [Frey, N. A.; Peng, S.; Cheng, K.; Sun, S., Chemical Society Reviews, 38, 9, 2532-2542, 2009]. However, the production of the metal oxide nanoparticles according to the above thermolysis methods has problems and limitations. First, it is necessary to heat the reaction mixture to very high temperatures, for example up to 360° C., which requires highly trained personnel and is dangerous in practice. Moreover, the use of expensive polyalcohol components as the reducing agent causes many side reactions that lead to polyaldehydes and polyorganic acids, resulting in difficult byproduct separations. The production cost of the metal oxide nanoparticles is high, because many expensive reactants, such as 1,2-hexanediol, are added. More importantly, the use of high temperature reactions is, in practice, dangerous and limits the choice of the nanoparticle capping agents. No polymers can be used and the obtained hydrophobically-coated nanoparticulate products can be only dispersed in organic solvents. In the method of rapid "hot-injection", a complicated process of synthesizing and purifying the metal precursor must be implemented, making it difficult to synthesize uniform nanoparticles in great quantity, and a complicated process must be conducted in order to precisely control the reaction conditions, reducing the reaction efficiency. The above methods has limited applications in the industry and usually produces nanocrystals with low magnetization [Y. Lee et al., Advanced Functional Materials, 15, 503-509, 2005; J. Ge, Y. Hu, M. Biasini, W. P. Beyermann, Y. Yin, Angewandte Chemie International Edition, 46, 23, 4342-4345, 2007—each incorporated herein by reference in its entirety].

Synthesizing metal oxide nanoparticles by precipitation in aqueous solutions does not require high temperatures and may involve simple manufacturing steps. However, synthesizing metal oxide nanoparticles by Massart's aqueous basic co-precipitation of metallic salts in water often lead to agglomerated nanoparticles, regardless of whether the co-precipitation is performed in the presence or absence of stabilizers and/or surfactants, and the size of the nanoparticles cannot be controlled [R. Massart, IEEE Transactions on Magnetics, 17, 2, 1247-1248, 1981; M. Mandavi et al., Molecules, 18, 7, 7533-7548, 2013; J. S. Basuki, A. Jacquemin, L. Esser, Y. Li, C. Boyer, T. P. Davis, Polymer Chemistry, 5, 7, 2611-2620, 2014; X. Gu, Y. Zhang, H. Sun, X. Song, C. Fu, P. Dong, Journal of Nanomaterials, 2015, Article ID 154592, 12 pages, 2015; Y. Lee et al., Advanced Functional Materials, 15, 503-509, 2005; Kamat, M., El-Boubbou, K., Zhu, D. C., Lansdell, T., Lu, X., Li, W., Huang, X., Bioconjugate Chemistry, 21, 2128-2135, 2010; Palmacci, S.; Josephson, L.; Groman, E. V. Patent WO9505669A1, 1995; Tassa, C.; Shaw, S. Y.; Weissleder, R., Accounts of Chemical Reseacrch, 44, 842-852, 2011; B. L. Cushing, V. L. Kolesnichenko, C. J. O'Connor, Chemical Reviews, 104, 9, 3893-3946, 2004—each incorporated herein by reference in its entirety]. In general, there are difficulties in achieving colloidal nanoparticles with narrow size distributions using wet chemical synthesis in aqueous solutions, regardless of whether the stabilizer is added during or after the precipitation of metal oxide nanocrystals [Hasegawa M., Hokukoku S., U.S. Pat. No. 4,101,435; Kresse M., Pfefferer D., Lawaczeck R., Wagner S., Ebert W., Elste V., Semmler W., Taupitz M. Gaida J., Herrmann A., Ebert M., Swiderski U., U.S. Pat. 20030185757; S. Palmacci, L. Josephson, U.S. Pat. No. 5,262,176; R. S. Molday, U.S. Pat. No. 4,452,773; Palmacci, S., Josephson, L., and Groman, E. V., Patent WO/1995/005669]. Thus, simpler, faster, practical, and non-tedious strategies to effectively produce monodisperse magnetic metal oxide nanocolloids are needed.

In view of the foregoing, the objective of the present invention is to provide a safer, simpler, efficient, scalable, and economical method of producing narrow-sized iron-based colloidal nanoparticles.

BRIEF SUMMARY OF THE INVENTION

According to a first aspect, the present disclosure relates to nanoparticles comprising: (i) a core comprising iron(III)

oxide and a metal oxide, wherein the core has an average diameter of 2-10 nm, and (ii) a surface coating comprising a carboxylate that chelates to a surface of the core and an amine that binds the surface of the core, wherein the nanoparticles are monodisperse, non-agglomerated, and have a saturation magnetization of up to 80 emu/g.

In most embodiments, the core is a spheroid.

In at least one embodiment, the metal oxide is at least one selected from the group consisting of strontium(II) oxide, titanium(II) oxide, vanadium(II) oxide, chromium(II) oxide, manganese(II) oxide, iron(II) oxide, cobalt(II) oxide, nickel (II) oxide, copper(II) oxide, and zinc(II) oxide.

In some embodiments, the surface coating weighs up to 65 wt % and the core weighs up to 35 wt %, relative to the total weight of the nanoparticles.

In most embodiments, the carboxylate is selected from the group consisting of saturated or unsaturated carboxylates with chain lengths between 6 and 30 carbon atoms, polymeric carboxylates, amino carboxylates, and polyamino carboxylates.

In some embodiments, the carboxylate is oleate, linoleate, linolenate, stearate, palmitate, laurate, caprate, or hexanoate.

In most embodiments, the amine comprises at least one nitrogen atom bound to the surface of the core.

In at least one embodiment, the amine is a saturated or an unsaturated amine with a chain length between 6 and 30 carbon atoms.

In one embodiment, the amine is hexylamine.

According to a second aspect, the disclosure relates to a method of forming the nanoparticles of the first aspect, comprising: (i) dissolving an iron(III) salt in water to form a first aqueous solution, (ii) mixing a carboxylic acid with the first aqueous solution to form a first mixture, (iii) mixing the amine with the first mixture, (iv) adding a second aqueous solution comprising a metal salt to form a second mixture, wherein a number of moles of the metal salt is 0.5 times relative to a number of moles of the iron(III) salt, (v) mixing a base with the second mixture to form a third mixture with a pH of 11-14 and heating the third mixture to temperatures up to 80° C. for up to 24 hours to form the nanoparticles, wherein an amount of the carboxylic acid is 1-15 fold relative to a number of moles of the iron(III) salt, wherein a number of moles of the amine is 1-15 times relative to the number of moles of the iron(III) salt.

In some embodiments, the carboxylic acid is selected from the group consisting of saturated or unsaturated carboxylic acids with chain lengths between 6 and 30 carbon atoms, polymeric carboxylic acids, amino acids, and polyamino carboxylic acids.

In at least one embodiment, the carboxylic acid is oleic acid, linoleic acid, linolenic acid, stearic acid, palmitic acid, lauric acid, capric acid, or hexanoic acid.

In most embodiments, the amine is a saturated or an unsaturated amine with a chain length between 6 and 30 carbon atoms.

In one embodiment, the amine is hexylamine.

In most embodiments, the metal salt is at least one of a strontium(II) salt, a titanium(II) salt, a vanadium(II) salt, a chromium(II) salt, a manganese(II) salt, an iron(II) salt, a cobalt(II) salt, a nickel(II) salt, a copper(II) salt, and a zinc(II) salt.

According to a third aspect, the disclosure relates to a nanocolloid comprising the nanoparticles of the first aspect, which are dispersed in at least one solvent, wherein the nanocolloid is stable for months, and a distance between neighboring cores is at least 2.5 nm.

In most embodiments, a concentration of the nanoparticles is about 1-10 mg/ml, relative to the total volume of the nanocolloid.

In at least one embodiment, the surface coating is hydrophobic and the solvent comprises a hydrocarbon.

In one embodiment, the surface coating is hydrophilic and the solvent comprises water.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Detailed Description of the Embodiments

Figure 1:
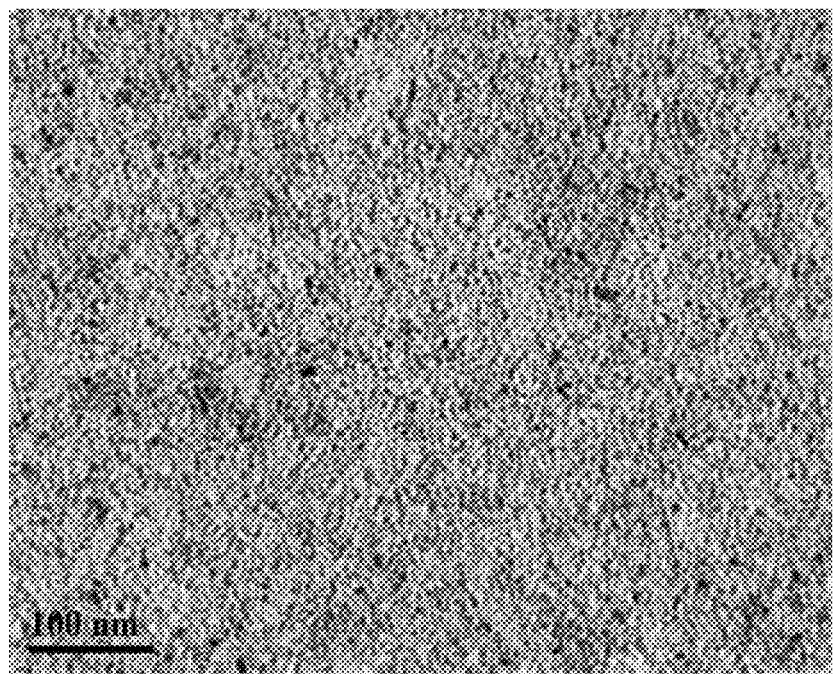
FIG. 1 is a transmission electron micrograph of an embodiment of coated magnetite nanoparticles at ×75 k.

Embodiments of the present disclosure will now be described more fully hereinafter with reference to the accompanying drawings, in which some, but not all embodiments of the disclosure are shown.

The present disclosure will be better understood with reference to the following definitions:

For nanoparticles with a core of a polygonal shape, the term "diameter", as used herein, and unless otherwise specified, refers to the greatest possible distance measured from a vertex of a polygon through the center of the face to the vertex on the opposite side. For spheres and spheroids, "diameter" refers to the greatest possible distance measured from one point on the sphere through the center of the sphere to a point directly across from it.

The term "monodisperse", as used herein, is characterized by particles of uniform size in a dispersed phase. Monodispersity can be indicated by a polydispersity index (PDI), which is a dimensionless measure of the broadness of the size distribution of the particles. The PDI ranges from 0 to 1, and a low PDI indicates the sample is or approaches monodispersity. A low PDI may also indicate the sample is non-agglomerated, which means the nanoparticles are well separated from one another and do not form clusters. Monodisperse particles have a PDI that is less than 0.2, preferably less than 0.17, more preferably less than 0.14.

The term "magnetite", as used herein, refers to iron(II,III) oxide, which has a stoichiometric formula $Fe_3O_4$, and is also commonly written as $FeO \cdot Fe_2O_3$.

The term "chelates", as used herein, refers to forming at least two separate coordinate bonds between multiple donor groups on a molecule and a single central atom. A chelate may also refer to kappa-2 coordination from a carboxylate ligand.

The term "base", as used herein, refers to a compound which dissolves in water and produces hydroxide ions.

The term "ultra-small", as used herein, refers to nanoparticles with a core size less than or equal to 10 nm.

The term "fold", as used herein, refers to multiples of 1.5 molar equivalents of a reagent relative to the number of moles of iron(III) salt. For example, 1 fold of oleic acid refers to 1.5 molar equivalents of oleic acid relative to the number of moles of iron(III) salt, and 3 folds of oleic acid refers to 4.5 molar equivalents of oleic acid relative to the number of moles of iron(III) salt.

The present disclosure is intended to include all isotopes of atoms occurring in the present nanoparticles and nanocolloids. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

According to the first aspect, the present disclosure relates to iron-based nanoparticles comprising a core and a surface coating. The nanoparticles are monodisperse and non-agglomerated with a PDI that is less than 0.2, preferably less than 0.17, more preferably less than 0.14. The size distribution of the core is less than 15%, preferably 12%, more preferably 9%. The nanoparticles have a saturation magnetization up to 100 emu/g, preferably 90 emu/g, more preferably 80 emu/g, which is higher than the values typically observed for ultra-small iron oxide nanocrystals [B. H. Kim et al., Journal of the American Chemical Society, 133, 32, 12624-12631, 2011; E. Taboada, E. Rodriguez, A. Roig, J. Oro, A. Roch, R. N. Muller, Langmuir, 23, 8, 4583-4588, 2007—each incorporated herein by reference in its entirety]. In a preferred embodiment, the nanoparticles are used in magnetic resonance imaging (MRI) as $T_1$ or $T_2$ relaxation agents for noninvasive cellular and molecular imaging. Magnetic iron oxide nanoparticles are mostly well-known for their $T_2/T_2^*$ effects serving as negative contrast agents, where they decrease the transverse relaxation time ($T_2$), producing a negative contrast from the environment by virtue of signal reduction. When the sizes of the magnetic nanoparticles shrink to less than or equal to 10 nm (i.e ultra-small), they can act as clinically-relevant $T_1$-weighted MRI contrast agent materials. [L. Zeng, W. Ren, J. Zheng, P. Cui, A. Wu, Physical Chemistry Chemical Physics, 14, 8, 2631-2636, 2012; B. H. Kim et al., Journal of the American Chemical Society, 133, 32, 12624-12631, 2011; E. Taboada, E. Rodriguez, A. Roig, J. Oró, A. Roch, R. N. Muller, Langmuir, 23, 8, 4583-4588, 2007—each incorporated herein by reference in its entirety]. In a more preferred embodiment, the nanoparticles described herein are employed as $T_1$ relaxation agents because the high magnetization of nanoparticles translates to being an effective $T_1$ relaxation agent [Elena Taboada, Elisenda Rodriguez, Anna Roig, Judit Oro, Alain Roch, and Robert N. Muller, Langmuir, 2007, 23 (8), pp 4583-4588—incorporated herein by reference in its entirety]. Other applications of iron-based nanoparticles include, but are not limited to, storage devices, energy storage, catalysis, labeling cells, detection of pathologies with cell dysfunctions, tissue regeneration, drug delivery, hyperthermia, and medical theranostics.

The diameter of the core ranges from 2-40 nm, preferably 2-30 nm, more preferably 2-10 nm. In a preferred embodiment, the core is a nanosphere or a nanospheroid. The core may also take on other shapes, including, but not limited to, a nanorod, a nontubular nanopolygon, a nanoring, a nanosheet, and a nanofiber. In one embodiment, the core is amorphous. In a preferred embodiment, the core is nanocrystalline. In this case, the core is crystalline with a high degree of magnetic ordering and crystallinity, thus providing advantageous properties for use as contrast agents in magnetic resonance imaging.

The core comprises iron(III) oxide and a metal oxide. The metal oxide may be strontium(II) oxide, titanium(II) oxide, vanadium(II) oxide, chromium(II) oxide, manganese(II) oxide, iron(II) oxide, cobalt(II) oxide, nickel(II) oxide, copper(II) oxide, zinc(II) oxide, or mixtures thereof. Preferably, the metal oxide is strontium(II) oxide, cobalt(II) oxide, iron(II) oxide, nickel(II) oxide, or zinc(II) oxide. More preferably, the metal oxide is iron(II) oxide.

The surface coating weighs 5-85 wt % of the total weight of the nanoparticles, preferably 25-85 wt %, more preferably 50-85 wt %, more preferably 50-65 wt %. Molecules containing an anchoring group to bind to the core surface are used in the synthesis of nanoparticles to impart a certain steric character and/or electrostatic stabilization of the core. The anchoring group may be cationic, neutral, or anionic. In a preferred embodiment, molecules with anionic anchoring groups are used. Non-limiting examples of molecules with anionic anchoring groups, which may be employed in the practice of this disclosure, include carboxylates, sulfonates, and phosphonates. In a preferred embodiment, carboxylates are used. The carboxylate comprises at least one oxygen atom bound to the surface of the core. In one embodiment, the carboxylate binds to the iron atom located on the core surface. The carboxylate may bind to the iron atom in a monodentate manner covalently or electrostatically. In a preferred embodiment, the carboxylate uses both of its oxygen atoms to bind to the iron atom in bidentate fashion (i.e. chelating) via non-ionic dative bonds.

The carboxylate may be a carboxylate of a fatty acid with a chain length between 6 to 30 carbon atoms, preferably between 6 to 18 carbon atoms, polymeric carboxylates, amino carboxylates, and polyamino carboxylates. The carboxylates of fatty acids can be saturated, or unsaturated with a trans or cis geometry about the carbon-carbon double bond. Preferably the carboxylate is oleate, linoleate, linolenate, stearate, palmitate, laurate, caprate, or hexanoate. More preferably, the carboxylate is oleate. Non-limiting examples of polymeric carboxylates include carboxylates of polyacrylic acid, polymethacrylic acid, hyaluronic acid, carboxymethyl dextran and their acid-based derivatives, polylactic acid, poly(lactic-co-glycolic acid). Non-limiting examples of amino carboxylates include carboxylates of arginine, lysine, glutamic acid, and aspartic acid, and enantiomers thereof. Non-limiting examples of polyaminocarboxylates include carboxylates of polylysine, polyarginine, and polyornithine, and stereoisomers thereof.

The amine comprises at least one nitrogen atom bound to the surface of the core. The amine may be a fatty amine with a chain length between 6 and 30 carbon atoms, preferably between 6 and 18 carbon atoms, more preferably 6 and 10 carbon atoms. The fatty amine can be saturated, or unsaturated with a trans or cis geometry about the carbon-carbon double bond. The fatty amine may be a primary or secondary amine. Preferably, the fatty amine is a primary amine. More preferably, the amine is hexylamine.

The surface of the core is covered with 400-1500 adsorbed molecules, such as the bound carboxylates and amines, preferably 500-800, more preferably 500-700. The surface of the core has 1-10 adsorbed molecules per $nm^2$, preferably 2-9 adsorbed molecules per $nm^2$, more preferably 5-8 adsorbed molecules per $nm^2$. The adsorbed molecules cover up to 100% of the surface of the core, preferably up to 80%, more preferably up to 70%.

In some embodiments, the surface coating comprises biocompatible molecules, preferably acid-terminated biocompatible molecules, to impart more biocompatibility characteristics (e.g. solubility in water, non-toxicity to living tissues) to the nanoparticles. Non-limiting examples of the biocompatible molecules include biopolymers, such as chitosan, elastin, heparin, hyaluronic acid, alginate, gelatin, collagen, and cellulose, and synthetic polymers such as polyethylene glycol, polyethylene oxide, polycaprolactone, polylactic acid, polyglycolic acid, poly(lactic-co-glycolic) acid, poly(ε-carbobenzoxy-L-lysine) (PLL), poly(acrylic acid) (PAA) and their block copolymers, poly(3-hydroxybutyrate-co-3-hydroxyvalerate), polydioxanone, poly(L-lactide-co-caprolactone), poly(L-lactide-co-D-lactide), poly(ethylene-co-vinyl alcohol), poly(acrylic acid), poly(vinyl alcohol), polyvinylpyrrolidone, and polyaniline. In a preferred embodiment, the biocompatible molecules are used as the carboxylates (e.g. alginate, elastin, hyaluronate, and heparin) that make up the surface coating. In an alternative embodiment, they are used in addition to the aforementioned carboxylates and amines.

In one embodiment, the surface coating further comprises biocompatible compounds that do not have either carboxylate or amine functionality but possess the alcohol and/or carbonyl functionality (e.g. polyethylene glycol, polyaniline, elastin, cellulose, polyethylene oxide, polycaprolactone, poly(3-hydroxybutyrate-co-3-hydroxyvalerate), polydioxanone, poly(L-lactide-co-caprolactone), poly(L-lactide-co-D-lactide), polyvinylpyrrolidone, poly(ethylene-co-vinyl alcohol), and poly(vinyl alcohol)). The aforementioned biocompatible compounds may utilize the hydroxyl oxygen and/or the carbonyl oxygen to bind to the core via non-ionic dative bonds.

In some embodiments, the surface coating comprises amphiphilic molecules, which can be alkyl iminopropionates, or (amido)betaines, for example, cocamidopropyl betaine and lauryl betaine.

Figure 22:
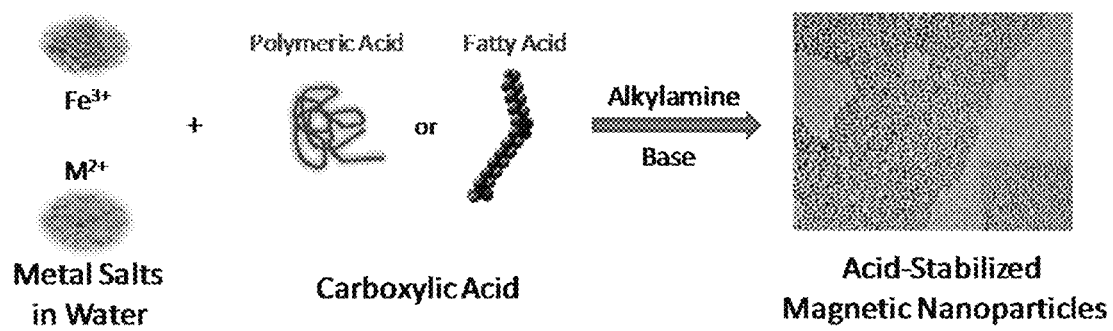
FIG. 22 is a reaction scheme of an embodiment of the present disclosure.

The second aspect of the disclosure relates to a method of making the nanoparticles. The method may be classified as a one-pot basic hydrolytic in situ precipitation of inexpensive and non-toxic metal ions in water at temperatures much lower (for example, 25-80° C.) than conventional thermal decomposition methods occurring at 200-400° C. This method may also produce monodisperse, non-agglomerated nanoparticles in high yields of 70-99%, preferably 75-95%, more preferably 85-95%, which cannot be achieved with the conventional Massart methods [R. Massart, IEEE Transactions on Magnetics, 17, 2, 1247-1248, 1981—incorporated herein by reference in its entirety]. The method of the present disclosure is based on basic hydrolytic in situ co-precipitation of acid-stabilized ionic metal salts, aided by the presence of amines, to prepare multigram quantities of stabilized nanoparticle colloids, without the use of high-boiling point solvents and elevated temperatures (FIG. 22). This method is also versatile because it uses water as solvent, thereby permitting the use of hydrophobic, hydrophilic, and/or amphiphilic surfactants, and surfactants with lower boiling points. For example, hexylamine, which is miscible with water and has a boiling point of 131.5° C., may be used as the amine in the method of the present disclosure but is excluded from conventional thermal decomposition methods. Therefore, the method described herein enables the production of ultra-small nanoparticles with a hydrophobic or a hydrophilic surface coating in one step. The colloidal nanoparticles, depending on their surface functionality, can be dispersed in hydrophobic solvents such as hexanes (for hydrophobic-coated nanoparticles) or in water (for hydrophilic-coated nanoparticles). This feature is rarely possible in other synthetic methods because they are limited by the type of solvent and high reaction temperature. Therefore, this safer, efficient, and economical method is suitable for scaling to the level of commercial production.

The synthesis of nanoparticles may be carried out under an inert atmosphere provided by argon or nitrogen gas. The method involves dissolution of an iron(III) salt in water to form a first solution. Non-limiting examples of the iron(III) salt include iron(III) acetylacetonate, Fe(III) acetate, Fe(III) chloride, Fe(III) sulfate, Fe(III) iodide, Fe(III) bromide, Fe(III) nitrate, iron perchlorate ($Fe(ClO_4)_3$), Fe(III) sulfamate, iron(III) trifluoroacetylacetonate disodium tetracarbonylferrate, and prussian blue in their free and/or hydrated forms. The concentration of the iron(III) salt in the first solution ranges from 0.05-1 M, depending on the scale of the reaction. For example, in a large-scale reaction that uses more than 50 g of iron(III) chloride hexahydrate, the concentration may range from 0.5-1 M, preferably 0.6-0.9 M, more preferably 0.7-0.8 M. In a small-scale reaction that uses less than 0.3 g of iron(III) chloride hexahydrate for example, the concentration may range from 0.05-0.5 M, preferably 0.1-0.4 M, more preferably 0.1-0.3 M. In a preferred embodiment, double distilled water is used. Deionized water, single distilled water, tap water, or HPLC-grade water may also be used as the source of water.

A carboxylic acid is mixed with the first aqueous solution to form a first mixture, which may be biphasic. For instance, when oleic acid is employed, a biphasic mixture is formed because oleic acid is immiscible with water. The carboxylic acid may be a fatty acid with a chain length between 6 to 30 carbon atoms, a polymeric carboxylic acid, an amino acid, or a polyamino acid. The fatty acid can be saturated, or unsaturated with a trans or cis geometry about the carbon-carbon double bond. Preferably, the carboxylic acid is oleic acid, stearic acid, palmitic acid, lauric acid, capric acid, or hexanoic acid. More preferably, the carboxylic acid is oleic acid. Non-limiting examples of the polymeric carboxylic acid include polyacrylic acid, polymethacrylic acid, hyaluronic acid, carboxymethyl dextran and acid-based derivatives, polylactic acid, poly(lactic-co-glycolic acid). Non-limiting examples of the amino acid include arginine, lysine, glutamic acid, and aspartic acid, and enantiomers thereof. Non-limiting examples of the polyaminocarboxylic acid include polylysine, polyarginine, and polyornithine, and stereoisomers thereof.

The amount of carboxylic acid may be varied to control the morphology, dispersity and uniformity of the nanoparticles. The number of moles of the carboxylic acid is 1-15 times relative to the total number of moles of the iron(III) salt and the metal salt, preferably 1-10 times, more preferably 1-6 times. The amount of the carboxylic acid can be varied to control the size of the core in terms of the average diameter. In one embodiment, at 0-1.5 folds of carboxylic acid relative to the amount of the iron(III) salt, nanoparticles with core sizes of 5-10 nm are produced. In another embodiment, at 2.5-10 folds of carboxylic acid, nanoparticles with core sizes of 2-5 nm are produced.

In one embodiment, the carboxylate salt is added instead of the carboxylic acid. Non-limiting examples of carboxylate salt include alkali metal (e.g. sodium and potassium) salts of the aforementioned carboxylic acids.

An amine is mixed with the first mixture. The addition of the amine is advantageous for forming ultra-small, monodisperse and non-agglomerated iron-based nanoparticles. In the absence of amine, agglomerated nanoparticles are formed. In one embodiment, the first mixture is a biphasic mixture, and the amine produces an emulsifying effect on the biphasic mixture, thereby enabling the iron cations to mix with the acid and/or carboxylate molecules to facilitate the encapsulation of iron cations by the carboxylate and/or amine molecules. In another embodiment, the first mixture is a solution.

The amine may be a fatty amine with a chain length between 6 and 30 carbon atoms. The fatty amine can be saturated, or unsaturated with a trans or cis geometry about the carbon-carbon double bond. Preferably, the amine is miscible with water. The fatty amine may be a primary or secondary amine. Preferably, the fatty amine is a primary amine. More preferably, the amine is hexylamine. The amount of fatty amine used may be varied to control the morphology, dispersity and uniformity of the nanoparticles. In one embodiment, the number of moles of the amine is 1-15 times relative to the total number of moles of the iron(III) salt and the metal salt, preferably 3-10 times, more preferably 7-9 times.

A second aqueous solution of a metal salt is added to form a second mixture. A concentration of the metal salt in the second aqueous solution is 0.3-0.7 times relative to the concentration of the iron(III) salt in the second mixture, preferably 0.4-0.6 times, more preferably 0.5 times. The metal salt is a strontium(II) salt, a titanium(II) salt, a vanadium(II) salt, a chromium(II) salt, a manganese(II) salt, an iron(II) salt, a cobalt(II) salt, a nickel(II) salt, a copper(II) salt, a zinc(II) salt, or a mixture thereof. Non-limiting examples of counter ions included in the metal salts include acetylacetonate, oleate, laurate, stearate, acetate, chloride, sulfate, iodide, bromide, nitrate, perchlorate, sulfamate, trifluoroacetylacetonate, and carbonate. Preferably, the metal salt is strontium(II) chloride, cobalt(II) chloride, nickel(II) chloride, or zinc(II) chloride to give a compound with a stoichiometric formula of $MFe_2O_4$, where M is Sr, Co, Ni, or Zn. More preferably, the metal salt is iron(II) chloride to give magnetite nanoparticles.

A base is added to the second mixture to form a third mixture with a pH of 11-14, preferably pH 11-13, more preferably to pH 11.5-12.5, to precipitate the nanoparticles. The third mixture is stirred for up to 12 hours. The addition of the base initiates nucleation of metal oxides. Non-limiting examples of a base include sodium hydroxide, sodium carbonate, trisodium phosphate, potassium hydroxide, lithium hydroxide, barium hydroxide, and ammonium hydroxide. The initial concentration of a solution of the base ranges from 1-20 M, preferably 5-15 M, more preferably 12-15 M. In a preferred embodiment, 15 M ammonium hydroxide (otherwise known as 30% of ammonia in water) is added to the second mixture. For a small-scale reaction, the volume of the solution of the base added ranges from 2-10 ml, preferably 2-6 ml, more preferably 2-4 ml. The solution of the base may be added dropwise or in small portions of 0.1-0.5 ml, preferably 0.2-0.4 ml.

In one embodiment, the third mixture is stirred at around ambient temperature for up to 12 hours, preferably up to 3 hours, more preferably up to 1.5 hours, to form the nanoparticles. In some embodiments, the third mixture is heated to temperatures up to 80° C. to improve the dissolution of the iron(III) salt, the metal salt, the carboxylic acid, and the amine. For large scale reactions, the third mixture is heated for up to 12 hours. For small-scale reactions, the third mixture is heated for up to 5 hours, preferably 3 hours, more preferably 1.5 hours. The third mixture is then cooled to ambient temperature, and the nanoparticles may then be isolated from the third mixture by centrifugation, for example by centrifugation at 3000 to 5000 rpm, for 5-15 minutes, preferably 10 minutes. The nanoparticles are washed several times and redispersed in a solvent of interest.

Figure 16:
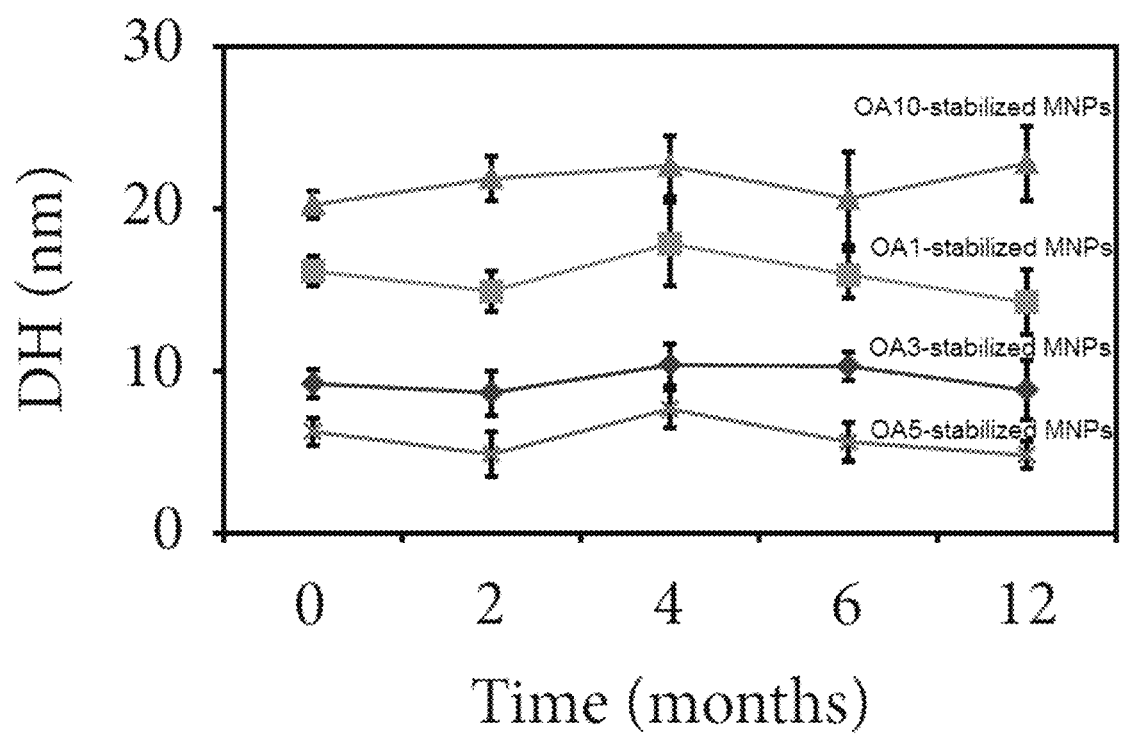
FIG. 16 shows the particle sizes of the coated magnetite nanoparticles from FIGS. 10 to 13, which are dispersed separately in hexane, over 12 months. "OA1-stabilized MNPs", "OA3-stabilized MNPs", "OA5-stabilized MNPs", and "OA10-stabilized MNPs" refer to the nanoparticles (MNPs) synthesized with 1, 3, 5 and 10 folds of oleic acid (OA) relative to the amount of the iron(III) salt. The y-axis, DH, refers to a hydrodynamic radius, an apparent size adopted by the solvated nanoparticles.

The third aspect of the disclosure relates to a nanocolloid comprising the nanoparticles dispersed in at least one solvent. The nanocolloid is prepared by mixing the nanoparticles, in one or more of their embodiments, with the at least one solvent to a concentration range of 1-50 mg nanoparticles per ml of nanocolloid, preferably 1-25 mg/ml, more preferably 1-10 mg/ml. A distance between each core is measured from an outer surface of a first core to an outer surface of a second core. The distance is 1-6 nm, preferably 2-5 nm, more preferably 2.5-4.5 nm. The nanocolloid is colloidally stable at ambient conditions for at least 1 month, preferably at least 4 months, more preferably at least 11 months. The term "colloidally stable", as used herein, means that the nanoparticles do not agglomerate at a measureable rate nor precipitate from solution. For example, there is substantially no precipitation and/or change in the size of the nanoparticles over the course of several months (FIG. 16). Magnetic nanocolloids are sought-after materials for the production of magnetofluids. These are used in industry as a sealing medium against dust and gases in magnetic fluid seals (liquid O-ring), for lubricating and supporting rotating shafts (magnetic levitation bearings) and for magneto-optical information storage. Applications in the medical-pharmaceutical sector are, for example, magnetic markers for diseased cells and magnetic cell separation in biological samples, and furthermore local application of medicaments.

In one embodiment, the nanoparticles comprise a surface coating with fatty acids and/or fatty amines. The surface coating is deemed hydrophobic, making the nanoparticles soluble in organic solvents, preferably hydrocarbons (e.g. hexane). Non-limiting examples of organic solvents in which such nanoparticles are soluble in include, ethers, esters, alcohols, ketones, and halogenated hydrocarbons.

A hydrophobic surface coating may be converted to a hydrophilic surface coating by exchanging the surfactants/ligands [M. H. El-Dakdouki, K. El-Boubbou, D. C. Zhu, X. Huang, RSC Advances, 1, 8, 1449-1452, 2011; K. El-Boubbou, R. O. Al-Kaysi, M. K. Al-Muhanna, H. M. Bahhari, A. I. Al-Romaeh, N. Darwish, K. O. Al-Saad, S. D. Al-Suwaidan, Journal of Nanomaterials, Volume 2015, Article ID 620672, 2015—each incorporated herein by reference in its entirety]. In one embodiment, the nanoparticles with the hydrophobic surface coating are dispersed in a hydrocarbon solvent (e.g. toluene) to form a nanocolloid with a concentration of 1-40 mg of nanoparticles per ml of solvent, preferably 1-20 mg/ml, more preferably 1-10 mg/ml. A solution containing the hydrophilic surfactants/ligands and a few drops of base is added to the nanocolloid, in a volume of 10 ml per ml of nanocolloid, preferably 8 ml per ml of nanocolloid, more preferably 5 ml per ml of nanocolloid. The mixture is stirred and/or refluxed for 1-5 hours, preferably 1-4 hours, more preferably 1-3 hours at temperature 20-50° C., preferably 20-40° C., more preferably 25-35° C. After which, the nanoparticles with a hydrophilic coating is isolated by centrifugation, and redispersed in water. In some cases, a double-exchange protocol using the polymers, aided by the presence of tetrabutylammonium tetrafluoroborate salts to facilitate the ligand exchange can also be used. [Dong, A., Ye, X., Chen, J., Kang, Y., Gordon, T., Kikkawa, J. M., Murray, C. B., Journal of the American Chemical Society, 133, 4, 998-1006, 2011—incorporated herein by reference in its entirety].

In some embodiments, the nanoparticles are synthesized with a hydrophilic carboxylic acid, amine, and/or the aforementioned amphiphilic molecule which imparts hydrophilic character to the surface coating. Non-limiting examples of a hydrophilic carboxylic acid include hyaluronic acid, heparin, alginic acid, polyacrylic acid, acrylic-based polymers, polyaminocarboxylic acid, poly(lactic-co-glycolic acid), poly(ε-carbobenzoxy-L-lysine), and their block copolymers. Non-limiting examples of a hydrophilic amine include saturated or unsaturated hydrophobic amines with a chain length between 6 and 30 carbon atoms. Such nanoparticles can be dissolved in the aforementioned grades of water, saline solutions, such as phosphate buffered saline, or a mixture thereof, for medical studies.

In some embodiments, the nanoparticles are attached to anticancer drugs, and the construct is used in drug delivery. The anticancer drugs have at least one functional group, such as amine, hydroxyl, preferably carboxylic acid, that can be used as a handle and/or an anchoring group to attach to the nanoparticles. Non-limiting examples of anticancer drugs include Doxorubicin, Daunorubicin, Epirubicin, Idarubicin, Bexarotene, Retinoic Acid (9-cis retinoic acid), Tretinoin (all-trans retinoic acid), Isotretinoin, Cytarabine, HX-531, and Calcitriol. In a preferred embodiment, the nanoparticles are coated with polyvinylpyrrolidine and Doxorubicin, and tested against breast cancer cells.

Example 1

Large-Scale Synthesis of Magnetite Nanoparticles

An aqueous solution (250 ml) of ferric chloride hexahydrate (50 g, 0.185 mol) and oleic acid (150 g, 0.531 mol) were mixed and magnetically stirred under argon for 20 min. Hexylamine (150 g, 1.48 mol) was then added during which the emulsive mixture turned rusty reddish. To the above mixture, an aqueous solution of ferrous chloride tetrahydrate (18.4 g, 0.0925 mol) was injected following a molar ratio of Fe(III)/Fe(II)=2. At this point, ammonium hydroxide (30%) was added until pH of ~12 was reached, and the mixture heated to 80° C. and vigorously stirred overnight. The black precipitate of nanoparticles formed was cooled to room temperature by removing the heat source, isolated via centrifugation (4500 rpm, 10 min), washed 3 times with 1-propanol and ethanol, respectively, and redispersed in hexane. Centrifugation (4500 rpm, 20 min) was then applied to remove any residue. The large-scale stable colloidal hexane solution of magnetite nanoparticles was stored at ambient conditions for several months. No precipitation was evident over the course of months.

Figure 2:
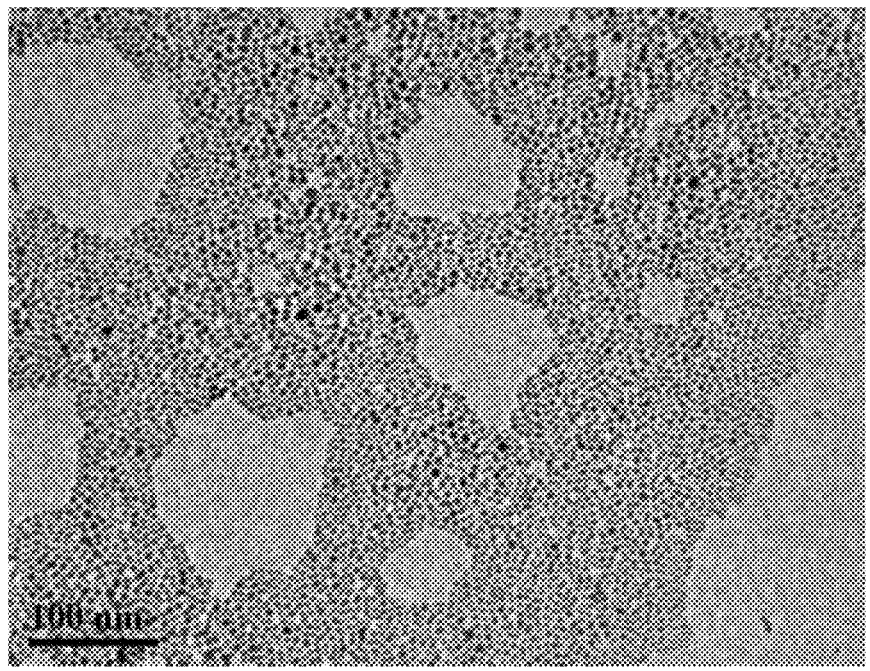
FIG. 2 is a transmission electron micrograph of an embodiment of coated magnetite nanoparticles at ×150 k.
Figure 3:
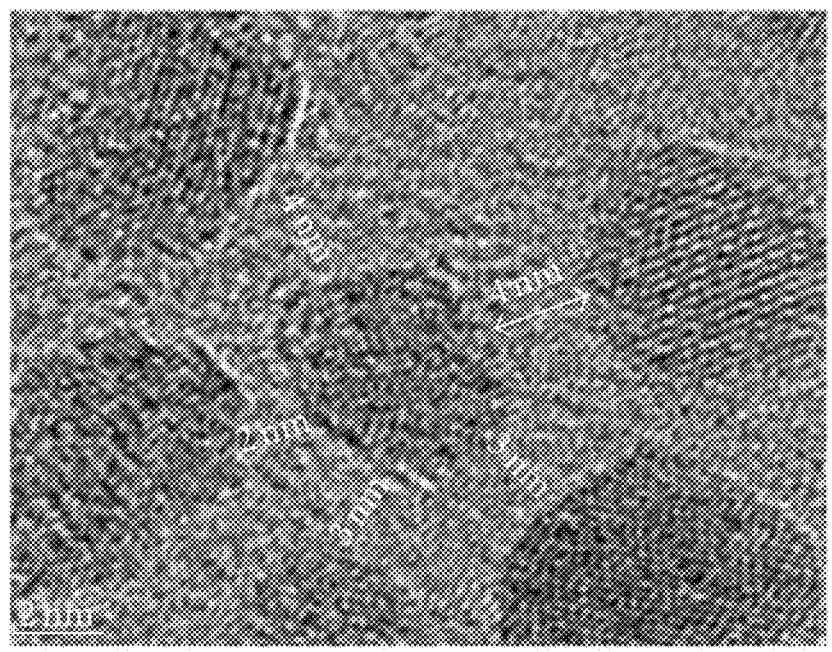
FIG. 3 is a high resolution transmission electron micrograph of an embodiment of coated magnetite nanoparticles at ×800 k, showing the distance between neighboring magnetite nanoparticles ranges from 2-4 nm.
Figure 4:
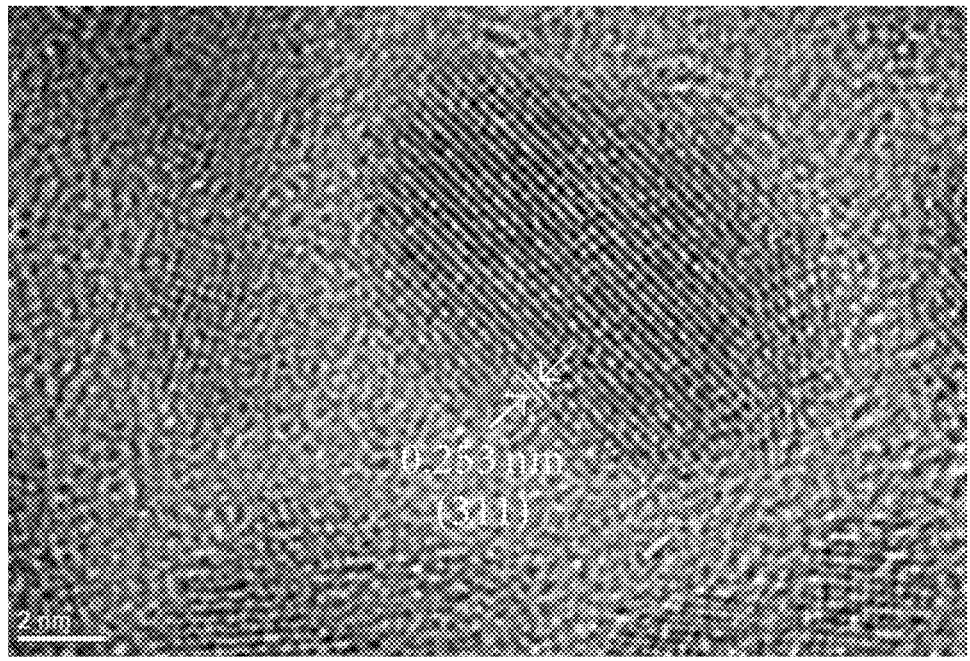
FIG. 4 is a high resolution transmission electron micrograph of an embodiment of coated magnetite nanoparticles at ×1000 k, showing a single magnetite nanoparticle with an interfringe spacing of 0.253±0.32 nm.
Figure 5:
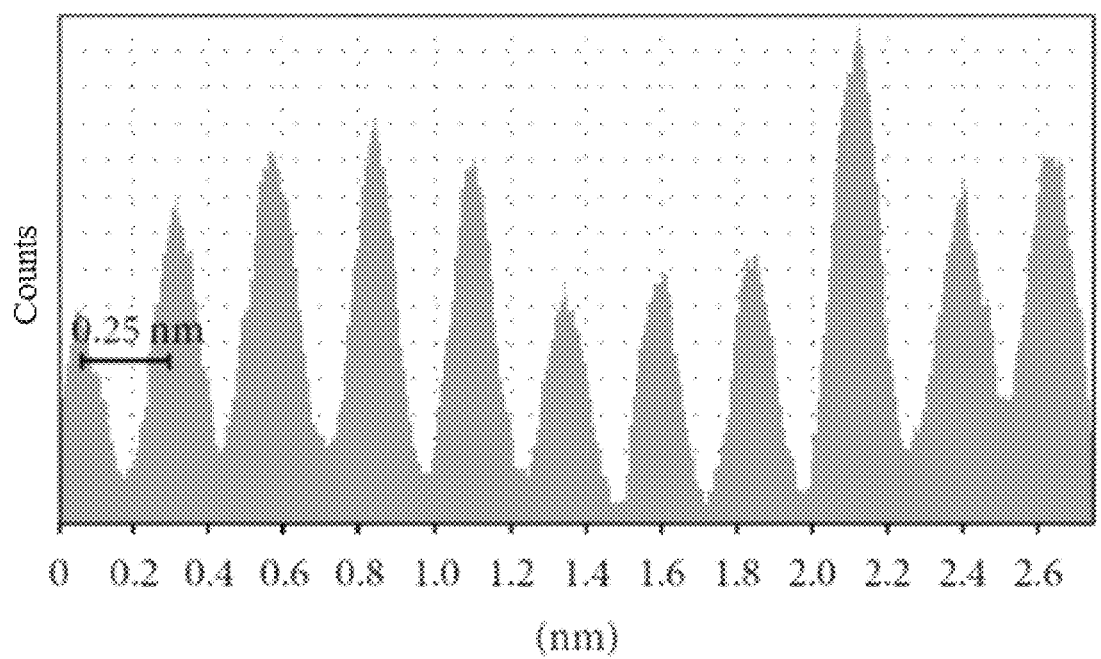
FIG. 5 shows a line intensity profile of coated magnetite nanoparticles, and resolves the interfringe spacing to be 0.253±0.32 nm.
Figure 6:
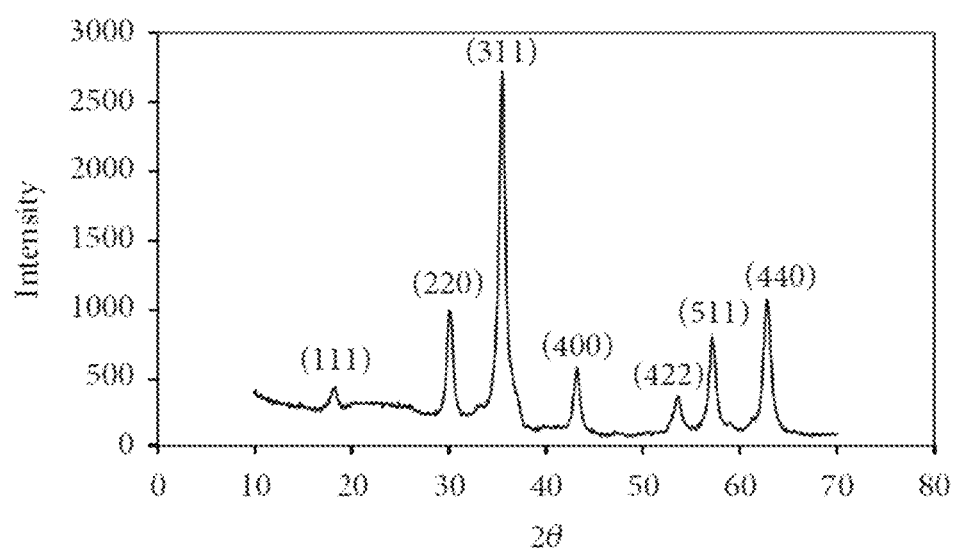
FIG. 6 is a powder X-ray diffraction pattern of an embodiment of coated magnetite nanoparticles.
Figure 7:
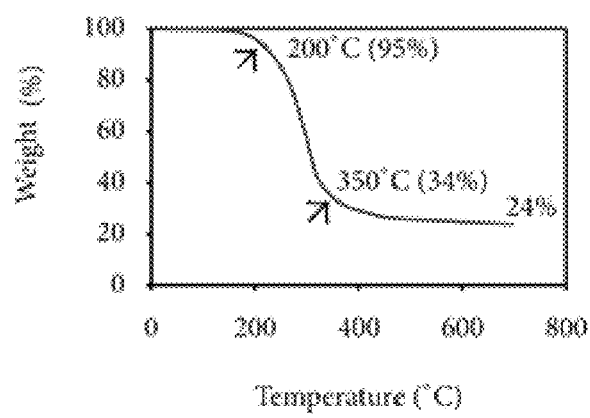
FIG. 7 shows a weight loss of an embodiment of coated magnetite nanoparticles heated to 700° C.
Figure 8:
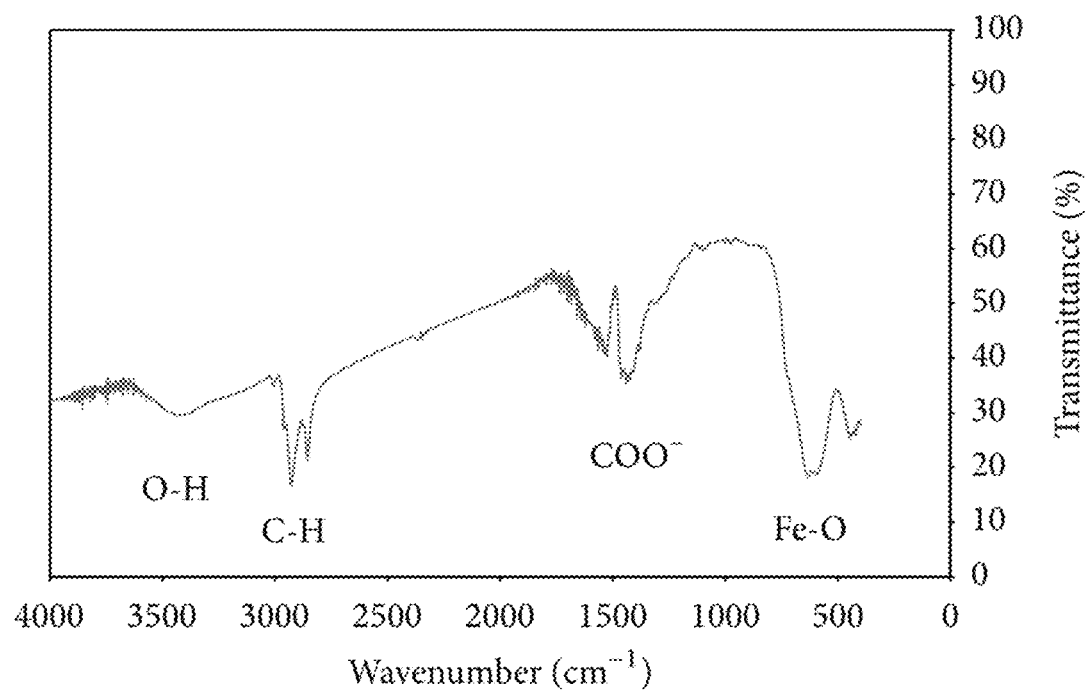
FIG. 8 is an infrared spectrum of an embodiment of coated magnetite nanoparticles.

FIG. 1 shows transmission emission micrographs of approximately 4-5 nm magnetite nanoparticles synthesized above, indicating the ordered packing and good uniformity achieved (no obvious aggregation was observed over the entire transmission electron microscopy (TEM) grid). When a drop of the nanocrystal dispersion is deposited onto the TEM copper grid at lower concentration, islands made of self-assembled nanocrystals were observed (FIG. 2). Inspection of the products by high-resolution TEM (HR-TEM) indicates a close-packed 2D array of relatively monodisperse nanoparticles with a narrow size distribution (<9%) and a neighbor spacing of ~3.5 nm (±1 nm) maintained by the hydrophobic capping groups (FIG. 3). Further analysis on HR-TEM images clearly shows the lattices of the nanoparticles, indicating that each particle is a well-ordered single crystal despite their small size (FIG. 4). In fact, the distance between two adjacent lattice fringes obtained by HR-TEM analysis of a single nanocrystal is calculated to be 0.253±0.32 nm corresponding to the lattice spacing of (311) planes of magnetite [L. Zeng, W. Ren, J. Zheng, P. Cui, A. Wu, Physical Chemistry Chemical Physics, 14, 8, 2631-2636, 2012—incorporated herein by reference in its entirety] (FIG. 5). The XRD pattern of the material agrees with published data for magnetite (JCPDS #019-0629), with reflection planes of 111, 220, 311, 400, 422, 511, and 440 clearly identified and 440 peak position centered at 62.5° [J. Jing et al., Journal of Nanoparticle Research, 14, 4, article 827, 2012—incorporated herein by reference in its entirety] (FIG. 6). The presence of oleic acid on the core surface was confirmed by FTIR (FIG. 8). FTIR spectra showed that magnetite nanoparticles have the distinctive characteristic absorption bands of magnetite (~585 cm$^{-1}$), with peaks at 1405, 1517, 2850, and 2915 cm$^{-1}$ ascribed to the asymmetric and symmetric C—O stretching vibrations of COO— and CH stretching mode of methyl and methylene groups, respectively. The observed shifts indicated that the carboxylate of oleic acid is bound symmetrically to the surface of magnetite nanoparticles in a chelating bidentate mode, as has been suggested before [S. Xuan, L. Hao, W. Jiang, X. Gong, Y. Hu, Z. Chen, Journal of Magnetism and Magnetic Materials, 308, 2, 210-213, 2007—incorporated herein by reference in its entirety]. The TGA studies revealed a 5% weight loss for a weakly bound surfactant layer, followed by a 60-65% weight loss corresponding to a tightly held oleic acid layer, further confirming the observed stabilization and solvation of oleic acid-stabilized nanoparticles in organic solvents [R. Tadmor, R. E. Rosensweig, J. Frey, J. Klein, Langmuir, 16, 24, 9117-9120, 2000—incorporated herein by reference in its entirety] (FIG. 7).

Example 2

Synthesis of OA1-, OA3-, OA5-, and OA10-Stabilized Magnetite Nanoparticles

"OA1-stabilized", "OA3-stabilized", "OA5-stabilized", and "OA10-stabilized" refer to the magnetite nanoparticles synthesized with 1, 3, 5 and 10 fold of oleic acid relative to the concentration of the iron(III) salt.

An aqueous solution (5 ml) of ferric chloride hexahydrate (0.27 g, 1.0 mmol) and oleic acid (0.424 g, 1.50 mmol) were mixed and magnetically stirred under argon in a degassed vial for 15 min. Hexylamine (0.81 g, 8.0 mmol) was then injected during which the emulsive biphasic mixture turns rusty reddish. After that, ferrous chloride tetrahydrate (0.10 g, 0.50 mmol) was added. After stirring for a few minutes, ammonium hydroxide (30%) (~3 mL) was added to the mixture until pH of ~12 was reached, and the mixed solution was heated to 80° C. and vigorously stirred for 90 min. The black precipitate started to form instantly following the addition of ammonium hydroxide, confirming the formation of nanoparticles. The black precipitate of nanoparticles formed was cooled to room temperature by removing the heat source, isolated via centrifugation (4500 rpm, 10 min), washed 3 times with 1-propanol and ethanol, respectively, and redispersed in hexane. Centrifugation (4500 rpm, 20 min) was then applied to remove any undispersed residue. The stable nanocolloidal hexane solution of ~6 nm magnetite nanoparticles was stored at ambient conditions for several months. No precipitation over the course of months was observed.

The above procedure was repeated with the concentration of oleic acid changed to 4.5 mmol (3-fold), 7.5 mmol (5-fold), and 15 mmol (10-fold) to produce 4 nm, 3 nm, and 2 nm sized magnetite nanoparticles, respectively (FIGS. 10 to 13).

Figure 9:
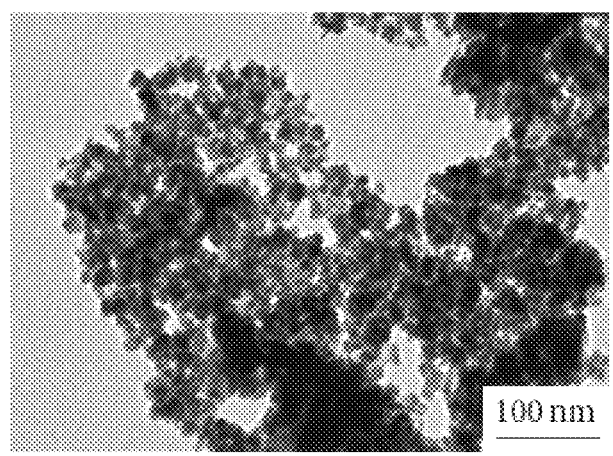
FIG. 9 is a transmission electron micrograph of an embodiment of coated magnetite nanoparticles prepared without oleic acid.
Figure 10:
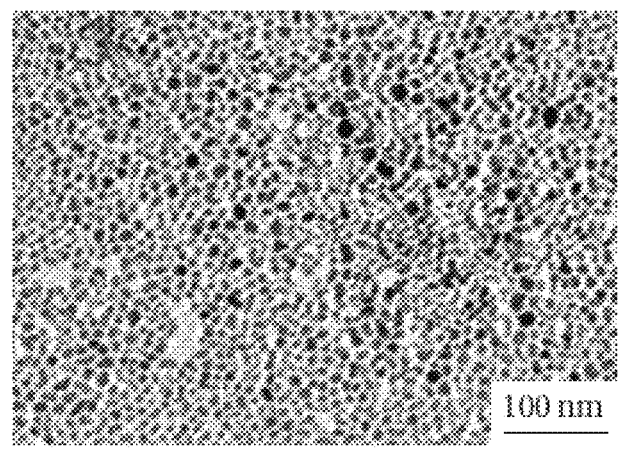
FIG. 10 is a transmission electron micrograph of an embodiment of coated magnetite nanoparticles prepared with 1 fold of oleic acid, relative to the amount of iron(III) salt.
Figure 11:
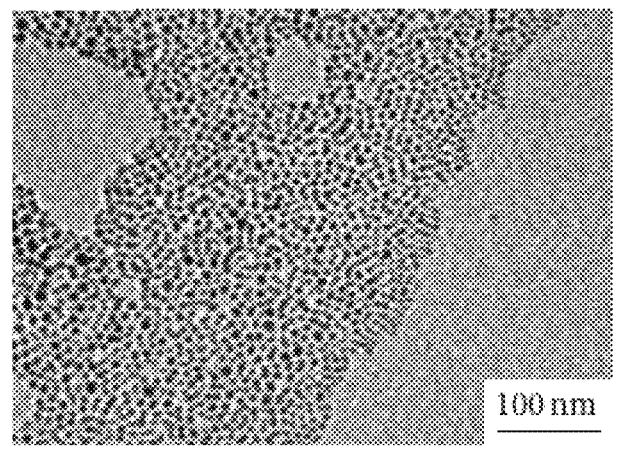
FIG. 11 is a transmission electron micrograph of an embodiment of magnetite nanoparticles prepared with 3 folds of oleic acid, relative to the amount of iron(III) salt.
Figure 12:
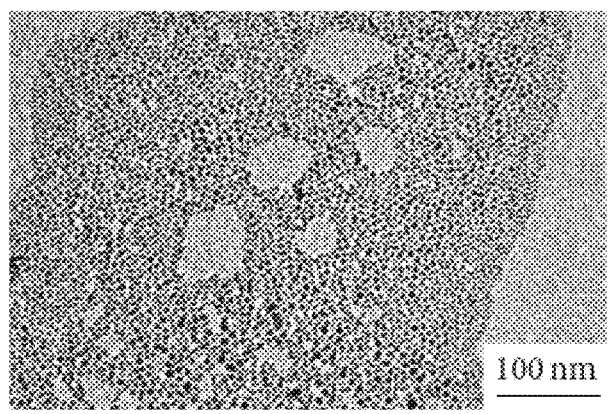
FIG. 12 is a transmission electron micrograph of an embodiment of magnetite nanoparticles prepared with 5 folds of oleic acid, relative to the amount of iron(III) salt.
Figure 13:
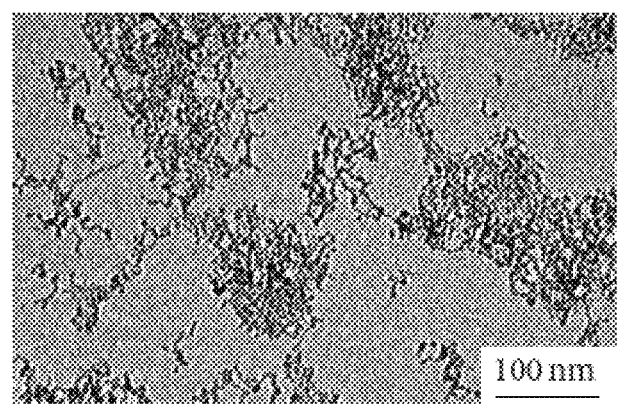
FIG. 13 is a transmission electron micrograph of an embodiment of magnetite nanoparticles prepared with 10 folds of oleic acid, relative to the amount of iron(III) salt.
Figure 14:
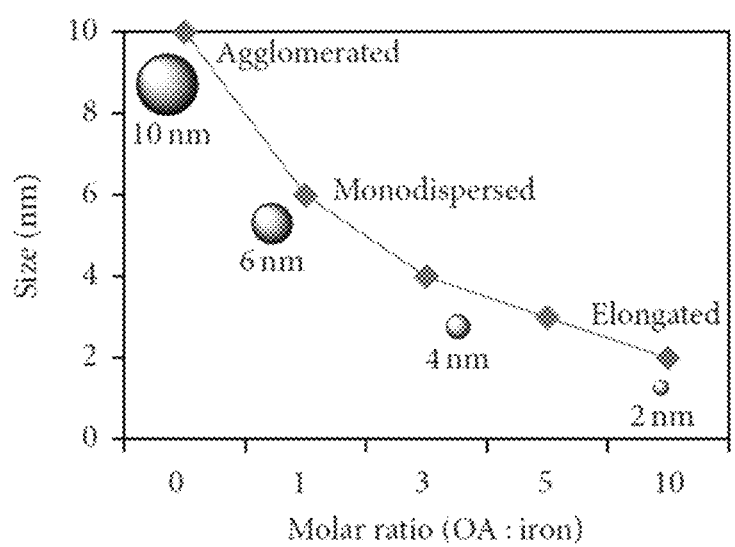
FIG. 14 shows the variation in size and morphology of coated magnetite nanoparticles shown in FIGS. 9 to 13.
Figure 15:
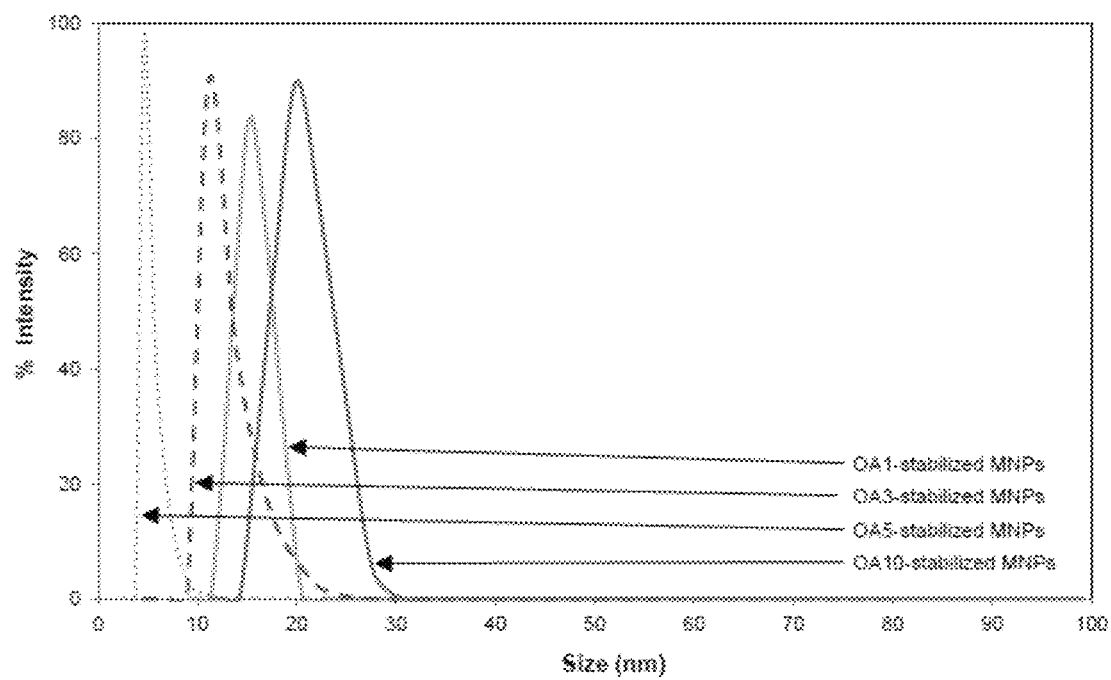
FIG. 15 compares the particle sizes of the coated magnetite nanoparticles from FIGS. 10 to 13 which are dispersed separately in hexane. "OA1-stabilized MNPs", "OA3-stabilized MNPs", "OA5-stabilized MNPs", and "OA10-stabilized MNPs" refer to the magnetite nanoparticles (MNPs) synthesized with 1, 3, 5 and 10 folds of oleic acid (OA) relative to the amount of the iron(III) salt.

The size and monodispersity of the product were found to be strongly dependent on the experimental conditions such as the concentration of oleic acid and the amount of hexylamine added. When no oleic acid was added, the particles were harvested as polydisperse agglomerates of bigger sizes (10-15 nm) dispersed in aqueous media, rather than in organic solvents (FIG. 9). On the other end, once the oleic acid concentration is too high (15 mmol), streak-like packing aggregates of nanoparticles were observed with worm-like elongated morphologies composed of linear aggregates of 2 nm magnetite cores (FIG. 13). FIG. 14 summarizes the morphology and size variations of the oleic acid-stabilized nanoparticles with various folds of oleic acid. Dynamic light scattering (DLS) measurements of the nanocrystal dispersions in hexane revealed that the size of nanoparticles decreases as the oleic acid concentration increases, further confirming the role due to the hydrophobic density of oleic acid capping during the synthesis. DLS clearly showed sharp peaks at ~5, 10, and 15 nm for the different samples, with no noticeable aggregation (FIG. 15). The ultra-small 2 nm nanoparticle streaks, however, were characterized with rather large size distributions and higher polydispersities as depicted from DLS measurements and polydispersities values, probably due to their elongated morphologies formed.

Moreover, DLS measurements were recorded for a time period of 12 months showing no significant changes in the size (FIG. 16), confirming the remarkable stability of the particles in their organic dispersions for months.

Next, magnetization of the different sized magnetite nanoparticles with their ultra-small sizes was measured. Field-dependent magnetization curves obtained at 298K showed a characteristic superparamagnetic behavior with a strong induced magnetizations (Ms=80 to 43 emu/g Fe), higher than the values typically observed for ultra-small iron oxide nanocrystals [B. H. Kim et al., Journal of the American Chemical Society, 133, 32, 12624-12631, 2011—incorporated herein by reference in its entirety], indicating a high degree of their magnetic ordering and crystallinity and showing their potential as $T_1$ contrast agents in magnetic imaging.

Example 3

Synthesis of Saturated Fatty Acid-Stabilized Magnetite Nanoparticles

To better understand the effect of the alkyl chain length on colloidal stability, a library of nanoparticles coated with saturated fatty acids of different carboxyl alkyl chains, RCOOH (R ranges from octadecyl to hexyl), and in the absence of hexylamine was prepared.

Ferric chloride hexahydrate (0.27 g, 1.0 mmol) and ferrous chloride tetrahydrate (0.10 g, 0.50 mmol) dissolved in 5 mL water were mixed with 1.50 mmol of different saturated fatty acids (i.e., stearic acid-C18, palmitic acid-C16, lauric acid-C12, capric acid-C10, and hexanoic acid-C6) and magnetically stirred under argon in a degassed vial for 15 min. If necessary, a minimal amount of dimethyl formamide is added to solubilize the fatty acid. Ammonium hydroxide (30%) (~3 mL) was slowly added until pH of ~12 was reached and the mixture was heated to 80° C. and vigorously stirred for 90 min. The black precipitate of fatty acid-stabilized nanoparticles formed was cooled to room temperature by removing the heat source, isolated via centrifugation (4500 rpm, 10 min), washed 3 times with 1-propanol and ethanol, respectively, and redispersed in hexane. Centrifugation (4500 rpm, 20 min) was then applied to remove any undispersed residue. The stable colloidal hexane solution of fatty acid-stabilized magnetite nanoparticles was stored at ambient conditions for several months. Precipitation of the particles occurred depending on the length of the fatty acid chain.

Figure 17:
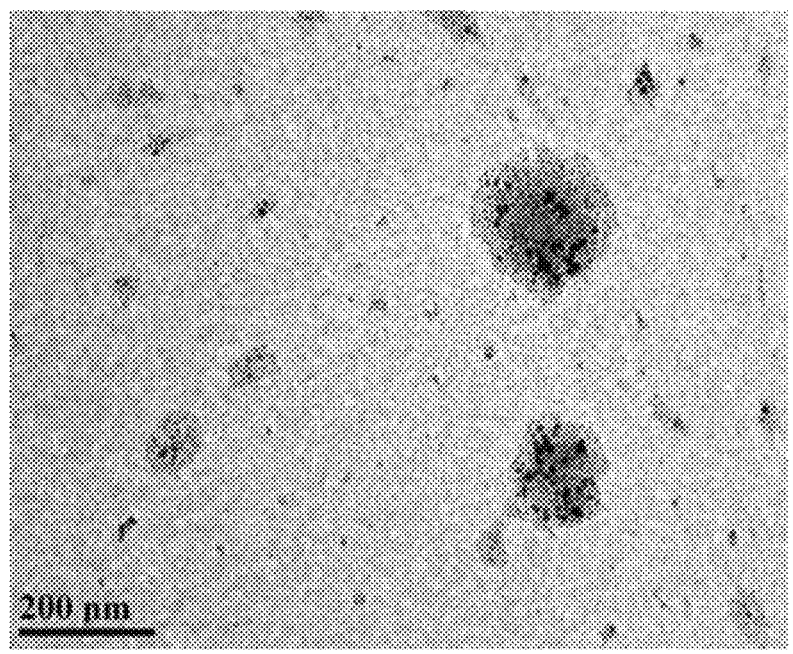
FIG. 17 is a transmission electron micrograph of an embodiment of coated magnetite nanoparticles stabilized by oleic acid only (i.e. without addition of hexylamine).
Figure 18:
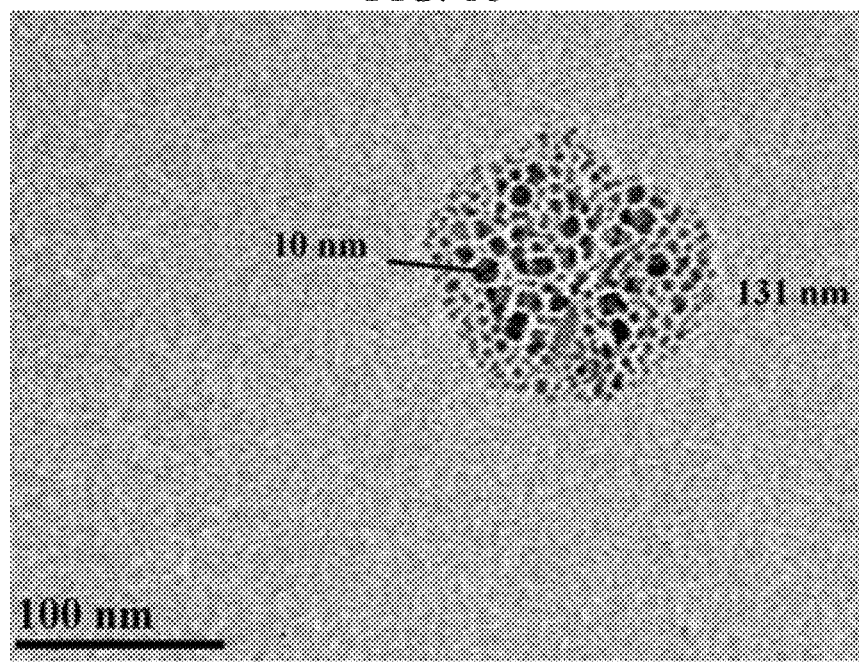
FIG. 18 is a transmission electron micrograph of the embodiment of coated magnetite nanoparticles in FIG. 17 at a higher magnification.
Figure 19:
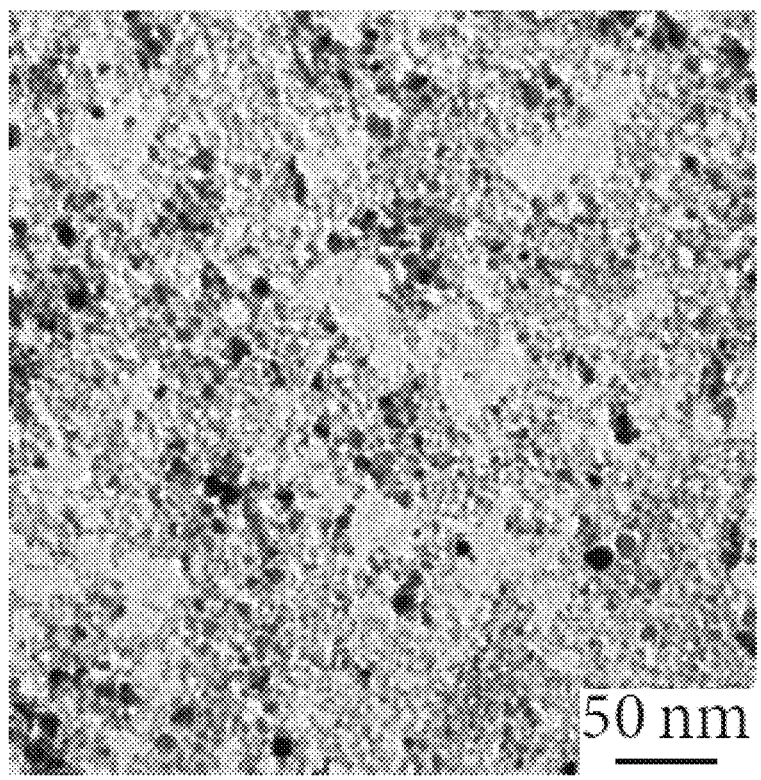
FIG. 19 is a transmission electron micrograph of an embodiment of coated magnetite nanoparticles stabilized by stearic acid only (i.e. without addition of hexylamine).
Figure 20:
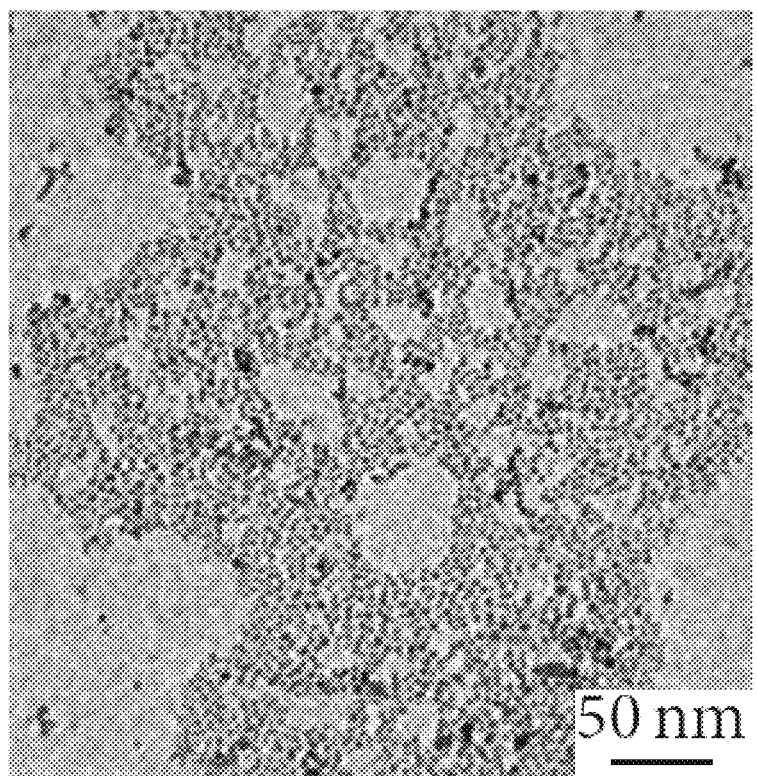
FIG. 20 is a transmission electron micrograph of an embodiment of coated magnetite nanoparticles stabilized by stearic acid and hexylamine.
Figure 21:
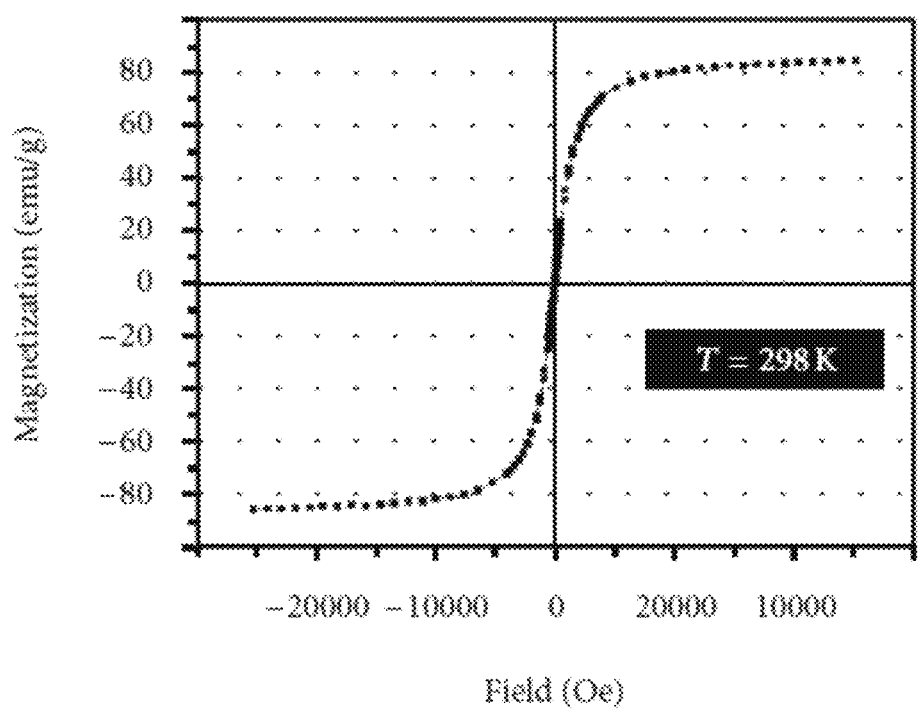
FIG. 21 is a representative field-dependent magnetization curve showing the characteristic superparamagnetic behavior of an embodiment of coated magnetite nanoparticles.

It was found that stearic acid kept the magnetite nanoparticles stabilized in hexane for months. In addition, the long-chain length acids (C16 and C18) appeared to be the best suited for particle derivatization with marked stabilization in their hexane dispersions. Therefore, stearic acid was chosen to study the effect of hexylamine addition to the synthetic procedure. For the synthesis in the presence of hexylamine, the same procedure was followed with the addition of 8.0 mmol of hexylamine. It was found that the uniformity, polydispersity, and size are clearly affected. TEM images of stearic acid-stabilized magnetite nanoparticles prepared with or without the addition of hexylamine, under identical experimental parameters are shown in FIGS. 17 to 19.

Further experiments indicated that the morphology of the product also depends strongly on the presence of hexylamine. When the synthesis is conducted without hexylamine, no effective transfer to the organic layer was observed and the reaction mixture resembled an oil-in-water micelle system. The particles were harvested as micelles containing nanoparticles of bigger sizes (5-15 nm) (FIGS. 17 to 18). It was also observed that the yield of the obtained oleic acid-stabilized nanoparticles dissolved in organic solvents increased as the concentration of hexylamine increased (~20% yield when 1.5 mmol hexylamine added versus >90% yields for 8 mmol hexylamine). From the above findings, it is concluded that the presence of hexylamine during the synthesis at 8 mmol or above is crucial to afford individual monodisperse nanocrystals. All the above results pinpoint the important roles of both oleic acid and hexylamine to control the size, dispersity, and morphology of the nanocrystals.

Weak adsorption of an alkylamine to the core surface was proposed and recently proven, indicating an amine-surface interaction via electron donation from the nitrogen lone pair to the positively charged iron ions [J. Cheon, N.-J. Kang, S.-M. Lee, J.-H. Lee, J.-H. Yoon, S. J. Oh, Journal of the American Chemical Society, 126, 7, 1950-1951, 2004; M. H. Wood, R. J. L. Welbourn, T. Charlton, A. Zarbakhsh, M. T. Casford, S. M. Clarke, Langmuir, 29, 45, 13735-13742, 2013—each incorporated herein by reference]. With the aid of the alkylamine, the ionic metal components become compartmentalized and isolated by the acids, acting as steric barriers and protective stabilizers. This method generates tiny oxide nuclei at the interfaces, which subsequently form well-ordered dispersions of acid-capped black metal oxide nanocrystals. Since the precursors become spatially separated at the water-oil interface, crystal growth can be limited and agglomerations can be inhibited in favor of small, well-dispersed particles [J. Baumgartner, A. Dey, P. H. H. Bomans et al., Nature Materials, 12, 4, 310-314, 2013; N. T. K. Thanh, N. Maclean, S. Mahiddine, Chemical Reviews, 114, 15, 7610-7630, 2014—incorporated herein by reference in its entirety]. In this way, the agglomerations of nanoparticles that usually occur in aqueous co-precipitation procedures are overcome. In fact, no growth of the particles was observed, even if the reaction was kept for 48 hrs, indicating the absence of both the acid and amine blocks crystal growth. The principle, described here, should be broadly applicable to the development of mixed metal oxide nanomaterials for a broad-range of applications.

Example 4

Synthesis of $MFe_2O_4$ Nanoparticles

Experimentally, the same procedure was followed using the corresponding metal (II) chloride salts instead of the Fe(II) precursor, and keeping a constant oleic acid concentration of 7.5 mmol (5-fold). For example, cobalt(II) chloride was used instead of iron(II) chloride to produce ultra-small sized $CoFe_2O_4$ nanocrystals. It was possible to prepare dispersible nanocrystals of various metal oxides: nanocrystals of doped iron(III) oxides $MFe_2O_4$ (M=Sr, Co, Ni, and Zn) were synthesized, and the nanoparticles were ~2 nm nanodots [K. El-Boubbou, R. O. Al-Kaysi, M. K. Al-Muhanna, H. M. Bahhari, A. I. Al-Romaeh, N. Darwish, K. O. Al-Saad, S. D. Al-Suwaidan, Journal of Nanomaterials, Volume 2015, Article ID 620672, 2015—incorporated herein by reference in its entirety]. The simple and cost-effective method described here could be developed into a generic approach to prepare metal oxide nanoparticles comprising many different oxide systems.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting the scope of the invention, as well as other claims. The disclosure, including any readily discernible variants of the teachings herein, defines, in part, the scope of the foregoing claim terminology such that no inventive subject matter is dedicated to the public.

The invention claimed is:
1. Nanoparticles consisting of:
   a single spheroid core consisting of
      a single crystal of magnetite,
      wherein the core has an average diameter of 2-10 nm; and
   a single surface coating consisting of
      a carboxylate that chelates to a surface of the core, the carboxylate using both of its oxygen atoms in a symmetric bidentate mode, wherein the carboxylate is saturated or monounsaturated and has a chain length between 12 and 18 carbon atoms, and
      hexylamine having a nitrogen atom bound to the surface of the core;
   wherein the surface coating comprises 65 to 85 wt %, and the core comprises 15 to 35 wt %, each relative to the total weight of the nanoparticles,
   wherein the surface coating is hydrophobic,
   wherein the nanoparticles are monodisperse, non-agglomerated, and have a saturation magnetization of up to 80 emu/g, and
   wherein the nanoparticles are prepared by:
      dissolving iron(III) chloride in water to form a first aqueous solution;
      mixing a carboxylic acid with the first aqueous solution to form a first mixture;
   then
      mixing hexylamine with the first mixture;
      adding a second aqueous solution comprising iron(II) chloride to the first mixture to form a second mix- ture, wherein a number of moles of the iron(II) is 0.5 times relative to a number of moles of the iron(III) in the second mixture; then mixing ammonium hydroxide with the second mixture to form a third mixture with a pH of 11-14 and heating the third mixture to temperatures up to 80° C. for up to 12 hours to form the nanoparticles;

wherein an amount of the carboxylic acid is 1-15 fold relative to a number of moles of the iron(III) chloride, wherein a number of moles of the hexylamine is 1-15 times relative to the number of moles of the iron(III) chloride, and wherein the carboxylic acid is a saturated or monounsaturated carboxylic acid with a chain length between 12 and 18 carbon atoms.

2. The nanoparticles of claim 1, wherein the carboxylate is oleate, and the carboxylic acid is oleic acid.

3. The nanoparticles of claim 1, which have a polydispersity index (PDI) of less than 0.14.

4. The nanoparticles of claim 1, wherein the surface coating comprises 5 wt % hexylamine relative to a total weight of the surface coating.

* * * * *